March 17, 1953 A. G. MORRISON 2,631,792
ATTACHMENT FOR FISHING REELS
Filed June 26, 1948
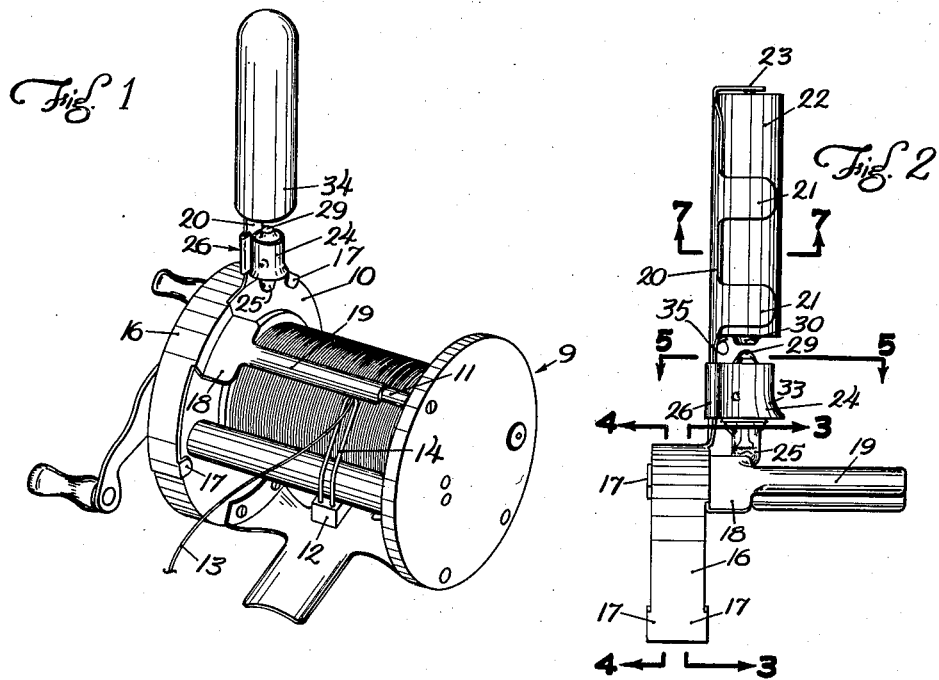
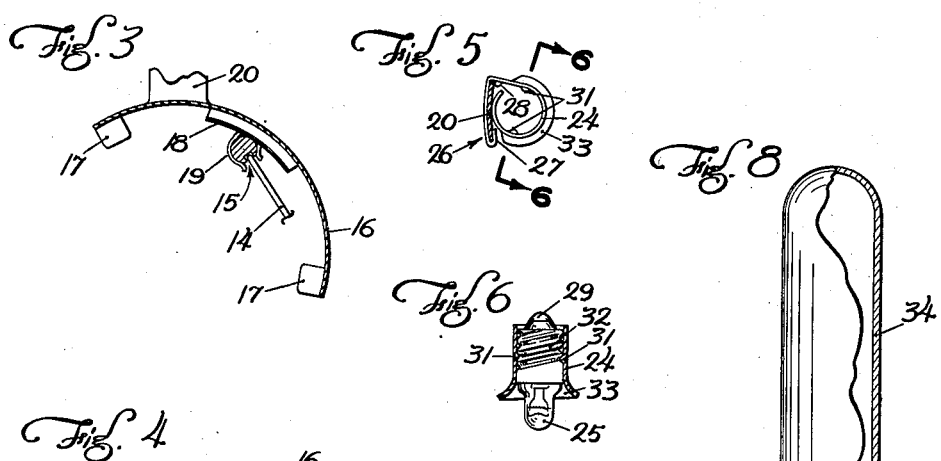
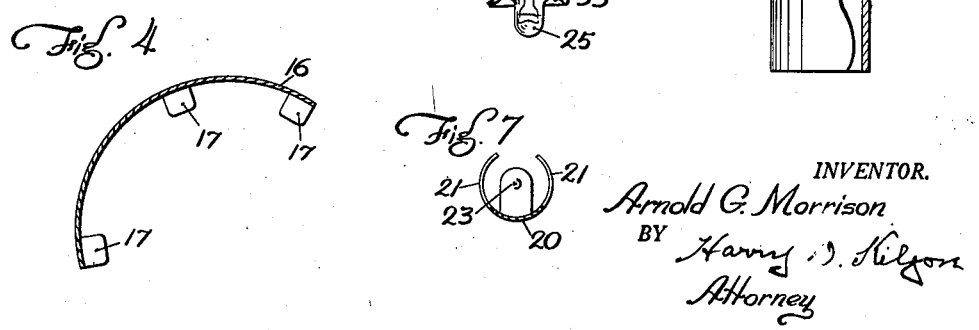
INVENTOR.
Arnold G. Morrison
BY Harry J. Kilgore
Attorney

UNITED STATES PATENT OFFICE 2,631,792

ATTACHMENT FOR FISHING REELS

Arnold G. Morrison, Minneapolis, Minn.

Application June 26, 1948, Serial No. 35,398

1 Claim. (Cl. 242—84.4)

The object of the invention is to provide a clip member attached to a side member and a cross-tie rod of a fishing reel wherein the cross tie member may be one cooperating with the reel level wind device and the clip will provide a finger piece. The clip might also be used to carry a flashlight.

Referring to the drawing:

Fig. 1 is a perspective view of a fishing reel having the attachment applied thereto;

Fig. 2 is an elevational view of the attachment removed from the reel;

Figs. 3 and 4 are fragmentary detail views partly in elevation and partly in section taken on the lines 3—3 and 4—4 of Fig. 2, respectively;

Fig. 5 is a detail view partly in elevation and partly in section taken on the line 5—5 of Fig. 2;

Fig. 6 is a detail view partly in elevation and partly in section taken on the line 6—6 of Fig. 5;

Fig. 7 is a detail view partly in elevation and partly in section taken on the line 7—7 of Fig. 2; and Fig. 8 is a view of the cap removed from the attachment, a portion thereof being broken away and sectioned.

The reel shown is indicated, as an entirety, by the numeral 9 with the exception of the gear housing 10, which affords one of the end members of the reel, the cross-tie rod 11, and the guide and level wind device 12 for the line 13 wound on said reel. The guide and level wind device 12 includes a hairpin shaped member 14 through which the line 13 extends. This member 14, at its closed end, travels in a groove 15 in the cross-tie rod 11.

The attachment includes a body member 16 in the form of a flat band that extends circumferentially on the periphery of the gear housing 10. This body member 16 has on its longitudinal inner and outer edges inturned ears 17 that overlap the sides of the gear housing 10 and hold the body member 16 against edgewise shifting movement on said gear housing. A wide flat finger-piece 18, integral with the inner edge of the body member 16, is inwardly offset over the cross-tie rod 11.

Integral with the outer edge of the finger-piece 18 is a long sleeve-like clip 19 that snaps over the cross-tie rod 11 and detachably holds the attachment on the reel 9. The longitudinal edges of the clip 19 are spaced apart to afford clearance for the member 14 of the guide and level wind device 12 and facilitate the application of said clip to the cross-tie rod 11.

In applying the attachment to the reel, the body member 16 is positioned over the gear housing 10 and the clip 19 over the cross-tie rod 11 and then pressure is applied to the finger-piece 18 which causes said clip to snap onto the cross-tie rod 11 and positions the body member 16 on the gear housing 10.

Integral with the body member 16, at its inner longitudinal edge, is a column 20 having upper and lower pairs of spring clips 21 that releasably hold a flashlight battery 22 in an inverted position. The upper end portion of the column 20 is turned inwardly over the battery 22 to afford a ground contact 23 for said battery.

A socket 24 for a light bulb 25 is slidably mounted on the column 20 below the battery 22. This socket 24 is rolled from a flat piece of metal and one end portion thereof is extended tangentially and then folded across the back of the column 20 to afford a slide 26. The free vertical portion of the slide 26 is folded onto the face of the column 20 to afford a guide 27 and a bead is pressed from the tangential portion of the socket 24 to afford a second guide 28. These guides 27 and 28 hold the slide 26 on the column 20. The free circular portion of the socket 24 yieldingly holds the socket 24 where positioned on the column 20. The light bulb 25 is held inverted in the socket 24 with its contact 29 positioned to engage the contact 30 on the battery 22 when the socket 24 is moved upwardly relative to the column 20. A pair of diametrically opposite beads 31 pressed from the socket 24 act as a thread for the screw-thread 32 on the light bulb 25. The lower portion of the socket 24 is outwardly flared to afford a shade 33 for the light bulb 25. A removable cap 34 is telescoped over the upper portion of the column 20 and the battery 22.

The entire attachment, with the exception of the socket 24 and the cap 34, is formed of a single sheet of flat metal. The column 20 is transversely curved to fit around the battery 22.

The battery 22 rests on a lug 35 cut and pressed from the column 20 and is held thereby in electrical engagement with the contact 23.

From what has been said, it will be understood that the invention described is capable of modifications as to details of construction and arrangement within the scope of the invention herein disclosed and claimed.

What I claim is:

A clip including a body member on the arc of a circle and that is wide, transversely flat, and applicable to the periphery of one of the two annular end members of a reel, said body member having integral with its longitudinal edges, inturned ears that overlap the sides of the respective end member and hold the body member from edgewise movement transversely of said end member, said reel having a cross-tie rod connecting its two end members, and a traveling line guide and leveling device, said cross-tie rod having a longitudinal groove in which said device works, said body member also having integral with its inner longitudinal edge, a long member comprising a part that overlaps the inner side of the respective end member, a second part that extends parallel to the cross-tie rod and affords a finger piece, and a third long sleeve-like part applicable to the cross-tie rod with a snap action and having a longitudinal passageway coincident with the groove in the cross-tie rod and in which passageway said device works.

ARNOLD G. MORRISON.

REFERENCES CITED

The following references are of record in the file of this patent:

UNITED STATES PATENTS

| Number | Name | Date |
|---|---|---|
| 1,369,008 | Christen | Feb. 22, 1921 |
| 1,398,799 | Recker | Nov. 29, 1921 |
| 1,439,067 | Cole | Dec. 19, 1922 |
| 1,469,649 | Sinkula et al. | Oct. 2, 1923 |
| 2,104,888 | Spahr | Jan. 11, 1938 |
| 2,145,929 | Herman | Feb. 7, 1939 |
| 2,170,186 | Catron | Aug. 22, 1939 |
| 2,190,403 | Foute | Feb. 13, 1940 |
| 2,236,071 | Roskam et al. | Mar. 25, 1941 |
| 2,261,610 | Yarosz | Nov. 4, 1941 |
| 2,283,430 | Frettem | May 19, 1942 |
| 2,341,073 | Babcock | Feb. 8, 1944 |
| 2,354,853 | Dobbs | Aug. 1, 1944 |

FOREIGN PATENTS

| Number | Country | Date |
|---|---|---|
| 21,276 | France (Addition to 493,173) | May 4, 1920 |